James Hazel Adamson. Grain Reaper and Dresser.

[47.]  
No. 118,574.

2 Sheets--Sheet 1.  
Patented Aug. 29, 1871.

Witnesses.  
Geo. H. Strong.  
J. Fitzgerald.

Inventor  
James Hazel Adamson  
By his Atty's  
Dewey & Co.

UNITED STATES PATENT OFFICE.

JAMES HAZEL ADAMSON, OF AUBURN, SOUTH AUSTRALIA.

IMPROVEMENT IN HARVESTERS.

Specification forming part of Letters Patent No. 118,574, dated August 29, 1871.

*To all whom it may concern:*

Be it known that I, JAMES HAZEL ADAMSON, of Auburn, county of Stanley, Colony of South Australia, have invented an Improved Grain-Reaping and Dressing-Machine; and I do hereby declare the following description and accompanying drawing are sufficient to enable any person skilled in the art or science to which it most nearly appertains to make and use my said invention without further invention or experiment.

Figure 1:
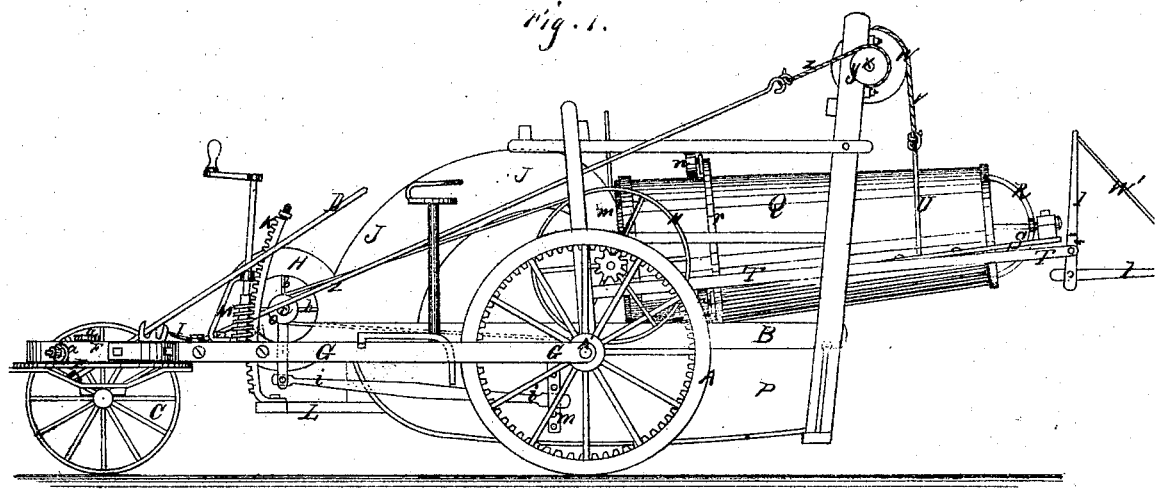
Figure 2:
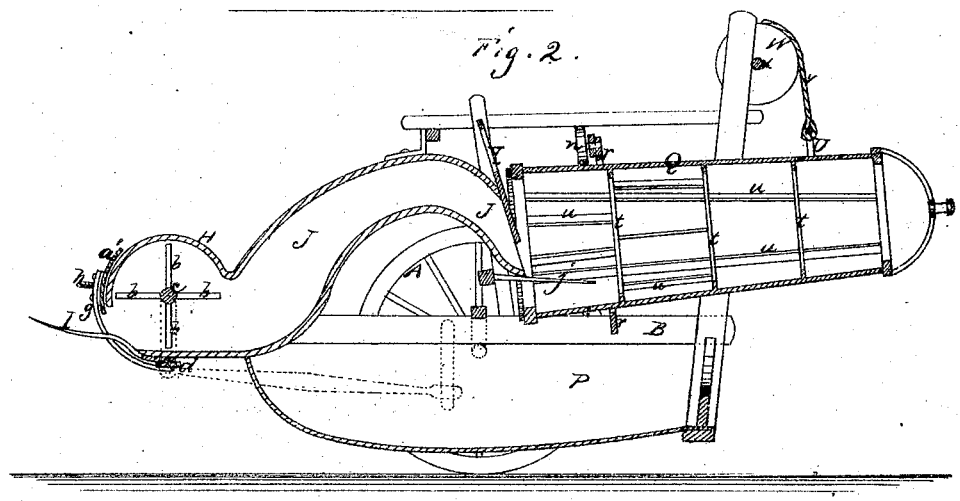
Figure 3:
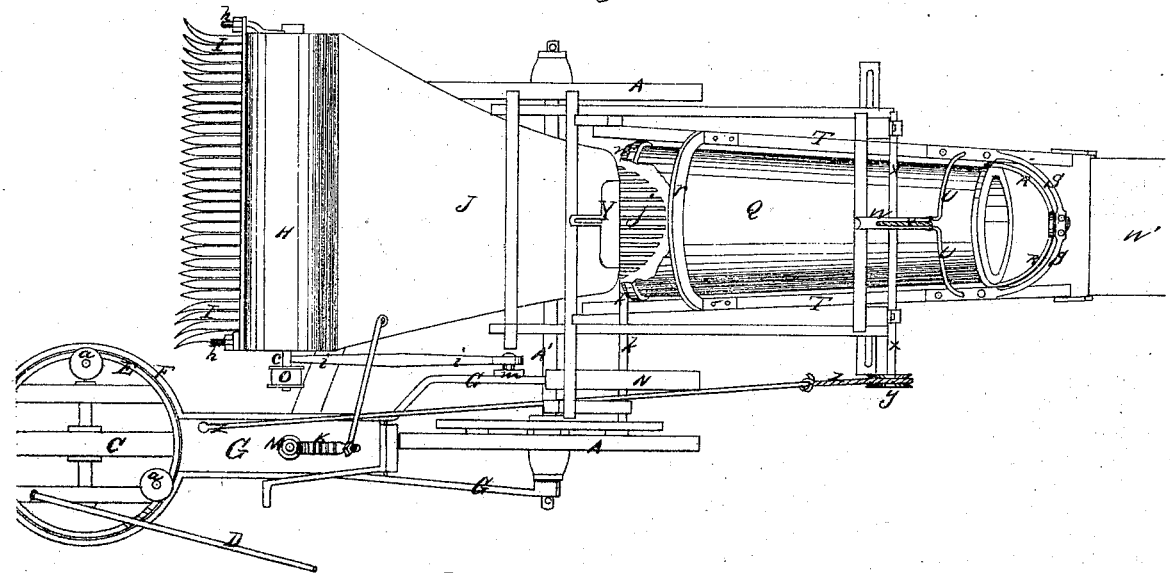
Figure 4:
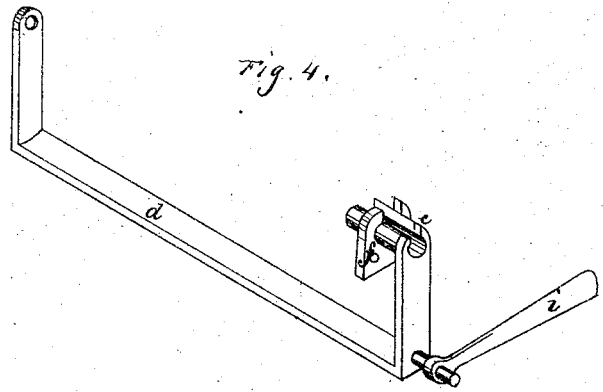

Referring to the accompanying drawing for a more complete explanation of my invention, A A are the bearing-wheels of the machine, mounted upon an axle suitable for supporting the frame B and the necessary mechanism. The steering-wheel C is placed at the front of the machine, and its frame G is connected by loose boxes to the axle A′, so as to allow the reaper to be elevated and depressed without affecting the steering-wheel. This wheel is turned from side to side by the movements of the team, or by means of a lever, D, within reach of the driver. In order to use as large a wheel as possible the bearings are fastened to a horizontal ring, E, which moves concentrically through another ring, F, and through the ring E the wheel projects. Friction-rollers $a$ $a$ are employed to make the rings move as easily as possible. The outer ring is firmly fastened to the frame G. At the front of the frame B is the beater-cylinder H, which lies transversely to the line of travel of the machine, and within it the beaters $b$ $b$ revolve upon their axle $c$. The comb I is composed of long pointed fingers, concave in their upper side, and extending forward from a back, and lying close together for most of the distance, but separated at the points so as to admit the straws of the grain; and as the machine passes the heads are pulled from the straw and swept directly back into the beater-cylinder, where the rapid motion of the beaters will separate the grain from the chaff, and also make a sufficient blast to carry the whole mass up through a suitable funnel, J. By making the fingers of a concave or spoon-shape any grain which is loosened from the head before entering the beater-cylinder is saved. The comb is bolted to a bar, $d$, which is bent at right angles at each end. This bar is pivoted in a line with the beater-shaft. At the inner end it carries a box or socket, $e$, which is so elongated as to rest in the crescent-shaped bearing $f$. This bearing is screwed to the frame or side of the beater-cylinder. Both the socket $e$ and the bearing $f$ are open at the top, so that the beater-shaft $c$, which passes through them, can be easily removed. By this construction the comb has a motion about the beaters, and is always kept at the same distance from them and moves with the least possible friction. Curved slotted guides $g$ may be attached to the bar $d$, and, moving over the pin $h$, will limit the motion of the comb. A connecting-rod, $i$, is attached to a point on the side of the arm or bar $d$, and extends back and is pivoted to the arm $m$, which is rigidly fastened to the frame G. By this arrangement the comb is always kept at the same relative angle to the ground when the reaper is elevated or depressed, to suit the height of the grain, and this prevents the loss of grain after it has fallen upon the comb, especially on descending ground. The front part of the reaper is elevated and depressed by means of a curved rack, K, which passes through the frame G and is bolted to the bar L. This bar extends beneath and is secured to the movable part of the machine or the frame B. The rack is operated by a worm or screw, M, the handle of which is within easy reach of the driver. The pulley N is driven by suitable gearing from the wheel A, and a belt from this pulley to the pulley O on the beater-shaft serves to drive the beaters. After the grain and chaff have passed up through the funnel J, before described, they pass over the wires $j$, which form an open riddle, through which most of the grain falls into the receiving-box P, beneath the machine; or an inclined conveyer may be employed, and the grain then be run directly into sacks by simply adding a platform at one side of the machine. The straw and chaff will pass over the riddle into the cone Q, which is supported so that its larger end opens toward the funnel J. This cone is revolved slowly around its axis by a pinion, not shown, on the shaft $k$, which meshes into the gear $m'$ on the cone. The rear end of the cone is supported by a gudgeon placed in a line with the axis of the axis of the cone and supported by the spider R. The box in which the gudgeon or journal turns is supported by arms S, as shown, or by other convenient device. The front end of the cone is supported by friction-rollers $n$ $n$, which are mounted on a stationary ring, $r$, so that the cone rotates easily. The interior of the cone is provided with a series of annular ribs, *t t*, to prevent the straw or chaff from slipping endwise, while the longitudinal vanes *u u* serve to raise the chaff and carry it partly up the side as the cone rotates. The force of gravity causes the chaff to fall through the blast of air which is passing through the cone, and by which the chaff will be carried out, while any wheat or unthrashed heads will fall toward the front end of the cone and eventually into the box P, or a separate receiver placed just under the mouth of the cone. In order to insure this effect and bring the wheat back it will be necessary to elevate the rear end of the cone so that it will stand at an angle. To do this, and also to regulate or change the angle of the cone, the arms S and the ring *r* are fastened to two timbers, T, which extend along the sides of the cone and are pivoted in a line with the shaft *k*, so that the movements of the cone will not throw it out of gear with the driving-pinion. The rear end of the timbers T have a yoke, U, from which a rope or chain, V, passes over the pulley W on the shaft X. At the near end of the shaft X is another pulley, *y*, over which a rope or chain, Z, passes and is connected, as shown, with the frame G. By this device, when the front part of the machine, containing the comb, is depressed, and, consequently, the rear part would be elevated, the rope will be allowed to wind upon the pulley *y*, as the distance from its point of attachment on the frame G is lessened. The weight of the cone and its attachments, while it rotates the shaft and winds up the chain Z, will unwind its own suspending chain V, thus allowing the rear end of the cone to be depressed in proportion as the rear end of the machine rises; and when the opposite movement takes place the cone will be elevated, as respects the machinery, but it will maintain a certain position or parallelism with regard to the ground, whatever change may be made in the position of the machine. A light canvas screen, W′, is mounted on a frame, *l*, behind the cone, and serves to protect its mouth from the wind, which, if fresh, would blow the chaff back into the cone. A gate, Y, is arranged to operate at the rear end of the funnel J, so as to regulate the blast which passes through the cone. The sides of the cone are made tight throughout, and the angle at which it stands is such that any grain or heads which are carried into it with the chaff will be carried up the side of the cone as it revolves, and when they fall back will strike the bottom at a point nearer the large or front end of the cone till they finally escape entirely, as before described. A considerable opening is left in front of the beater-cylinder H, in order to allow the comb to move up and down, as before described. The size of this opening is regulated by a curved plate, *a′*, Fig. 2, which is adjustably bolted to the curved guides *g*, and partakes of the motion of the comb and slides over the cylinder H in its movements, as shown.

Having thus described my invention, what I claim, and desire to secure by Letters Patent, is—

1. The combination of the comb I, bar *d*, connecting-rod *i*, and arm *m*, constructed and arranged substantially as and for the purpose herein described.

2. The combination, substantially as described, of the beaters *b b*, the funnel or chute J, and the adjustable rotating cone Q with its annular ribs and longitudinal vanes, as and for the purpose set forth.

3. The combination of the pulleys W and *y* on the shaft X, the supporting-chain V, and the operating-chain Z, with the frame G for retaining the cone in the same relative position with the ground when the movable part of the machine is elevated or depressed, all the parts being constructed and operated as described.

In witness whereof I have hereunto set my hand and seal.

J. H. ADAMSON. [L. S.]

Witnesses:
   ARTHUR CHAPMAN,
     *Adelaide, S. A.*
   MICHAEL KENYSHAUGH,
     *Adelaide, South Australia.*